Patented May 26, 1936

2,042,430

UNITED STATES PATENT OFFICE 2,042,430

PREGNANCY ANTIGEN

Benjamin Gruskin, Philadelphia, Pa., assignor to Lakeland Foundation, Chicago, Ill., a corporation of Illinois No Drawing. Application June 18, 1934, Serial No. 731,117

9 Claims. (Cl. 167—78)

This invention relates to a substance commonly referred to as antigen.

This application is a continuation in part of application Serial No. 703,245, filed December 20, 1933.

The primary object of the present invention is to provide an antigen for determining whether or not a female is in the state of pregnancy.

Another object of the invention is the provision of an antigen prepared from the placenta preferably human to determine whether or not a female is pregnant.

Another object of the invention is a test to determine whether or not a female human being is pregnant by an intradermal injection of an antigen prepared from the human placenta.

A still further object of the invention is the method of preparing an antigen consisting in obtaining human placenta from the mother within such a short time as to preclude tissue deterioration, preferably within two hours after birth, and reducing the placenta to a powder to which powder there are added several ingredients and chemicals to form the proper solution for performing a test to determine whether or not a female human is pregnant.

Another object of the present invention is to provide an antigen for intradermal injection in a woman for the determination of pregnancy.

Numerous other objects and advantages will be apparent throughout the progress of the following specification.

The theory upon which the present invention and discovery is based, consists in the fact that the placenta contains a characteristic protein, and that when an antigen made up of an extract of that protein is introduced intradermally into a pregnant female, this characteristic protein will incite the fixed cells to respond allergically by producing pseudopodia. Therefore, upon the theory herein expounded, and of which innumerable tests have proven correct, an antigen made from the placenta, introduced into the skin of a female who is pregnant, will cause the formation of pseudopodia, which will appear at the margin of the wheal formed by the injection.

Antigen

The antigen is prepared from the human or mammalian placenta, which is obtained preferably not later than two hours after birth because of the disintegration of the tissued cells after that time, it being made certain that the placenta is obtained from a perfectly healthy patient. The placenta so obtained is thoroughly washed in running water, and the membranes and the fibrous portion cut into pieces of the desired size which may be about three inches square to facilitate the washing of the placenta, so that all traces of blood may be removed. When the blood has been thoroughly washed away, the placental tissue is ground in a meat grinder. The ground placenta is then placed in acetone for dehydrating and for removing lipoids, there being one part of the tissue to four parts of the acetone. The tissue and placenta are placed in tubes, and thoroughly shaken in the acetone, and allowed to remain therein for five hours. The tubes with the acetone and ground placenta are then centrifuged for five minutes, after which time the acetone is poured off, the cells remaining in the bottom of the tubes. The placental tissue or cells are then removed from the tubes and are spread out on flat dishes to dry thoroughly, and to permit rapid evaporation of the acetone. When thoroughly dried, it is ground in a mortar to a fine powder.

The dry tissue of the placenta just described is extracted with an inorganic hydroxide, such as sodium hydroxide. One-tenth normal sodium hydroxide (NaOH) in the proportion of one and one-half grams of the placental tissue to one hundred cubic centimeters of sodium hydroxide, one-tenth normal is preferred. The sodium hydroxide, one-tenth normal (NaOH) is made up in the proportion of four grams of sodium hydroxide C. P. to one liter of distilled water in a volumetric flask. The ground tissue is first ground to a smooth paste in a mortar by first adding a few cubic centimeters of the sodium hydroxide, and then adding the rest of the one-tenth normal sodium hydroxide slowly. The cells are carefully mixed with the solution, so that a perfectly smooth suspension of the cells in the sodium hydroxide is obtained. The extract of the cells and sodium hydroxide is then poured into large test tubes or a straight sided cylinder and allowed to stand for 24 hours, after which time, the supernatant solution is pipetted off. The volume of the supernatant solution should be measured in a sterilized graduate. This supernatant solution, which is the alkaline extract of the placental tissue, is then placed in a sterile bottle of a volume more than twice that of the extract so as to allow for the addition of an acid and buffer solution, which is used in neutralizing the alkaline extract.

The acid and buffer solution for neutralizing the alkaline extract comprises 2.27 grams of anhydrous C. P. primary potassium phosphate (KH$_2$PO$_4$) and 4.235 cubic centimeters of concentrated hydrochloric acid, (HCl, C. P.) (specific gravity 1.18-1.19, 35% solution) made up to one liter with distilled water in a volumetric flask. This gives a solution which is .05 normal with respect to primary potassium phosphate, and which is .05 normal with respect to hydrochloric acid.

The acid and buffer solution just described is added to the alkaline extract which has been pipetted off from the cells and measured. The acid and buffer solution should be added slowly and the solutions carefully stirred or gently agitated while the acid and buffer solution is being added. After the acid and buffer solution has been added in an amount equal to the alkaline extract of the tissue, a few more cubic centimeters of the acid and buffer solution may be required.

The resultant solution should then be tested to see if the neutralization is nearing the end point. This testing should be repeated frequently to make sure that the titration does not go past the end point, which is of a pH of 6.9 for this process.

If the resultant solution is made too acid, the protein of the antigen will be precipitated. The antigen should be checked electrometrically, or it may be checked against a standard solution of a pH of 6.9, using the spot plate method, with brom-thymol-blue as an indicator.

The standard solution is made of anhydrous primary potassium phosphate, 1/15 molar, 9.078 grams of the pure salt, in one liter of freshly distilled water in a volumetric flask, and anhydrous secondary sodium phosphate, 1/15 molar, 9.472 grams of pure salt, made up to one liter with freshly distilled water in a volumetric flask. These solutions are combined in a pyrex container in the proportion of 4.9 parts of the solution of primary potassium phosphate to 5.1 parts of the solution of secondary sodium phosphate. The mixture of these solutions has a pH of 6.9.

When the end point of the titration has been reached, as ascertained by the electrometric method, or by the matching of the antigen to the standard solution of pH 6.9, a preservative which consists of a solution of tri-cresol and glycerin C. P. in the proportion of one part of tri-cresol to two parts of glycerin may be added.

The total volume of the finished antigen is calculated, that is, the volume including the alkaline extract and the added volume of the acid and buffer mixture. To each ten cubic centimeters of antigen there is added two drops of the tri-cresol and glycerin preservative from a capillary pipette having an internal diameter of one millimeter at the dropping end. A sterile stopper should be placed on the bottle containing the antigen, and the solution should at once be shaken thoroughly so that the preservative will be evenly dispersed throughout the antigen. A rubber stopper neutral in reaction and of the cap type is preferably used for the bottle containing the antigen so that the solution may be withdrawn by means of a syringe and needle, and the bottle need not be opened. After the preservative has been added to the antigen, and the solution thoroughly shaken, the antigen may then be drawn from the large container by means of a pyrex syringe and put into small pyrex vials for use.

In preparing the antigen practically all of the placental tissue may be utilized, including the maternal and foetal layers. This gives a very practical and definite antigent for general uses and purposes. However, for the differential diagnosis between early and late pregnancy it has been found that in the later months of pregnancy the foetal layer of placenta gives a plainer and stronger reaction than when the whole placenta is used. While in early pregnancy it has been found that the material layer of the placenta gives a plainer and stronger reaction than if purely foetal or if mixed placenta were used. However, the mixture of both layers is practical throughout entire pregnancy and gives a plain and strong reaction capable for all practical intents and purposes. Of course, proportions of the foetal and maternal layers may be varied to suit the desired requirements. An antigen relating specifically to the use of the foetal layer only of the placenta is claimed in applicant's co-pending application Serial No. 76,874, filed April 29, 1936.

Test

One-tenth of one cubic centimeter of the above antigen is drawn off into a small syringe to which there is attached a very fine short needle. The antigen is injected intradermally, after first sterilizing and treating the surface of the patient's skin and rendering it perfectly dry. The injection is performed by stretching the skin with one hand and injecting the antigen intradermally, the injection being made by the usual intradermal method. In positive cases, that is, in cases where the patient examined is pregnant, a slight area of reaction will be noticed surrounding the small bubble, termed a wheal, which wheal occurs from the injection, and pseudopods will form. Pseudopods are radial elongations extending outwardly from the edges of the wheal. In negative cases, that is, in cases where the patient is not pregnant, no pseudopod formation will take place.

The above test is based on the fact that since the placenta is made up of both maternal and foetal layers, a characteristic protein of foetal embryonic character is partly absorbed into the system of the mother. When an extract made up from the placental material is injected intradermally, pseudopods will be formed because of the homologous nature of the protein, according to the laws of protein desensitization or allergy.

The invention and discovery herein set forth designates, to a high degree of certainty, whether or not a female is pregnant. The particular antigen herein described is made from placenta obtained from the mother preferably not later than two horus after birth because of the disintegration of tissued cells, and while the exact method herein described is preferable, it is to be understood that various changes, to a certain degree, may be made without departing from the spirit of the invention or sacrificing any of its advantages, and the right is hereby reserved to make all such changes as fairly fall within the scope of the following claims.

The invention is hereby claimed as follows:

1. An antigen specific to the determination of pregnancy by intradermal injection comprising a neutralized, inorganic alkaline hydroxide extract of placental tissue.

2. An antigen specific to the determination of pregnancy by intradermal injection comprising a neutralized, inorganic alkaline hydroxide extract of placental tissue having a pH of substantially 6.9.

3. An antigen specific to the determination of pregnancy by intradermal injection comprising a neutralized sodium hydroxide extract of mammalian placental tissue.

4. An antigen specific to the determination of pregnancy by intradermal injection comprising a neutralized sodium hydroxide extract of human placental tissue having a pH of substantially 6.9.

5. The process of making an antigen for intradermal use to determine if pregnancy exists which consists in extracting placental tissue with an inorganic alkaline hydroxide, separating the extract, and then neutralizing the extract.

6. The process of making an antigen for intradermal use to determine if pregnancy exists which consists in obtaining an inorganic alkaline extract of placental tissue, and then adding an acid and buffer solution to reduce the extract to a pH of approximately 6.9.

7. The process of making an antigen for intradermal use to determine if pregnancy exists comprising extracting placental tissue with sodium hydroxide, separating the extract, and then neutralizing the extract with potassium phosphate and hydrochloric acid.

8. The process of making an antigen for intradermal use to determine if pregnancy exists comprising extracting human placental tissue with one-tenth normal sodium hydroxide (NaOH), and then adding an acid and buffer solution of potassium phosphate ($KH_2PO_4$) and hydrochloric acid (HCl) to reduce the extract to a pH of substantially 6.9.

9. An antigen to determine if pregnancy exists comprising an extract of mammalian placental tissue adapted for intradermal injection, which extract contains a specific foetal embryonic protein homologous to the specific foetal embryonic protein of a pregnant mammalian and which produces a skin reaction by pseudopod formation when the said antigen is injected intradermally in a pregnant female mammalian.

BENJAMIN GRUSKIN.

CERTIFICATE OF CORRECTION.

Patent No. 2,042,430.  May 26, 1936.

BENJAMIN GRUSKIN.

It is hereby certified that error appears in the printed specification of the above numbered patent requiring correction as follows: Page 2, second column, line 1, for "antigent" read antigen; same page and column, line 8, for "material" read maternal; line 56, for "horus" read hours; and that the said Letters Patent should be read with these corrections therein that the same may conform to the record of the case in the Patent Office.

Signed and sealed this 21st day of July, A. D. 1936.

(Seal)

Henry Van Arsdale
Acting Commissioner of Patents.